United States Patent [19]

Gelardi et al.

[11] Patent Number: 5,056,735
[45] Date of Patent: Oct. 15, 1991

[54] VIDEO CASSETTE INTEGRAL ACTUATOR/REEL LOCK/SPRING

[75] Inventors: John Gelardi, Cape Porpoise; Dick Rolfe, Biddeford, both of Me.; Alan Lowry, Canton, Mass.; Craig Lovecky, Old Orchard Beach, Me.

[73] Assignee: Shape Inc., Biddeford, Me.

[21] Appl. No.: 389,906

[22] Filed: Aug. 4, 1989

[51] Int. Cl.$^5$ .............................................. G11B 15/32
[52] U.S. Cl. ..................................... 242/198; 360/132
[58] Field of Search ............... 242/197, 198, 199, 200; 360/132

[56] References Cited

U.S. PATENT DOCUMENTS

| | | | |
|---|---|---|---|
| 4,232,890 | 11/1980 | Sugawara | 242/198 |
| 4,449,673 | 5/1984 | Ohta et al. | 242/199 |
| 4,473,202 | 9/1984 | Verhoeven | 244/198 |
| 4,513,928 | 4/1985 | Hackett | 242/198 |
| 4,553,717 | 11/1985 | Takagi | 242/198 |
| 4,579,295 | 4/1986 | Harada | 242/198 |
| 4,585,187 | 4/1986 | Okamura et al. | 242/198 |
| 4,604,671 | 8/1986 | Oishi | 360/132 |
| 4,607,307 | 8/1986 | Sieben | 360/132 |
| 4,621,779 | 11/1986 | Fitterer et al. | 242/199 |
| 4,631,619 | 12/1986 | Hashizume et al. | 360/132 |
| 4,633,355 | 12/1986 | Harada | 360/132 |
| 4,635,878 | 1/1987 | Didriksen | 242/198 |
| 4,650,136 | 3/1987 | Tsuruta | 242/198 |
| 4,702,434 | 10/1987 | Brauer | 242/199 X |
| 4,739,949 | 4/1988 | Lin | 242/198 |
| 4,802,048 | 1/1989 | Perkins et al. | 242/198 X |
| 4,918,558 | 4/1990 | Igarashi et al. | 242/199 X |

*Primary Examiner*—Daniel P. Stodola
*Assistant Examiner*—Paul T. Bowen
*Attorney, Agent, or Firm*—Staas & Halsey

[57] ABSTRACT

An integral actuator/reel lock/spring for a video cassette is described, including: (a) a lock body having a first end and a second end, an inclined opening at the first end to receive a tape player/recorder pin, lateral wings, angled grooves and a lead in for a self-centering rib in the cassette base; and (b) a spring bar connected centrally at the second end of the lock body, the spring bar including a pawl and a lower dog leg combination formed at each end. The lock body is received in the cassette base in an area defined by: (a) a first, elongated, central portion having parallel side walls, between which is formed a self-centering rib; and (b) a pair of lateral, substantially triangular walled portions, each spaced from the central portion. The lock body fits substantially within the central portion with the wings extending above the parallel walls, the grooves resting on the parallel walls, the spring bar extending across the parallel walls, the pawls pivotably mounted against the lateral portions and the dog legs underlaying the reels. In the "locked" position, the biasing spring bar normally urges the lock body inward in the central portion. The pawls contact by ratchet action teeth formed on the circumference of each bottom reel flange. During the locked condition, the reel lock has the ability to pivot to each side of a center line of the central portion to move with shifting reels. When the cassette is placed in the player/recorder, a pin of the tape player/recorder enters the inclined opening and forces the lock body against the forece of the spring arm. Only at this time does the lead-in receive the selt-centering rib to direct the lock body backwardly along the center line. Also, the spring arm becomes more curved, pulling the pawls toward the center line and out of ratchet engagement with the teeth so that the lock body enters the unlocked position.

16 Claims, 5 Drawing Sheets

VIDEO CASSETTE INTEGRAL ACTUATOR/REEL LOCK/SPRING

BACKGROUND OF THE INVENTION

This invention relates to tape cassettes and, more particularly to a means for preventing rotation of the tape reels of a video cassette For convenience of reference, when describing the tape cassette of the prior art and the present invention, "inward" means in a direction toward to the interior of the cassette from its sides, "outward" means in a direction toward the sides of the cassette from the interior, "upward" means in a direction toward the cassette cover from the cassette base, and "downward" means in a direction toward the base from the cover.

A conventional tape cassette has a flat, substantially rectangular configuration, which may be formed of a suitable plastic, and includes a cassette base and cover, each having side walls. Tape reels are usually suitably located in side-by-side relation within the cassette so as to be freely rotatable, and a magnetic tape is wound on the tape reels.

Each reel is intentionally made to float independently relative to its respective hub receptacle formed in the cassette base due to various industry tolerances. Further, as tape is wound from one reel to another, the tape mass on each reel changes. Under these conditions, one reel may shift or float backwardly, while the other is shifted toward the front. A reel lock must compensate for these shifts, so that both reels are reliably and independently locked.

The industry has almost uniformly adopted a multi-piece, reel lock, such as shown and described in U.S. Pat. Nos. 4,447,020 or 4,232,840. Such multipiece reel locks include a separate actuator, a pair of separate movable arms for respectively locking the reels, and a separate spring for biasing the arms toward the reels. This design efficiently compensates for reel shifting because each arm can lock independently.

Of course, such a multipiece lock, despite its known reliability, is rather expensive to produce and assemble. Further, due to the number of parts and the fabrication requirements for each part, production yields cannot be maximized.

Due to these drawbacks, attempts have been made to make the actuator, reel lock and spring one piece to cut down on manufacturing and assembly costs. For example, as described in U.S. Pat. No. 4,739,949 and as shown in FIG. 1 herein, a reel lock can be molded as a single piece of flexible elastic plastic material.

More particularly, a front bottom edge 1a of a locking base 1 is shaped as an inclined surface to receive a conventional tape player/recorder pin (not shown) during operation. Each side of a back edge 1b of the locking base 1 includes a concave fixing wing 11. The bottom of the free end of each fixing wing 11 locks with serrations 31 positioned peripherally around the tape reels 3.

The locking base 1 is located within two, parallel guiding walls 21 that are formed at the middle inside of the cassette base 2. The guiding walls 21 are as high as the locking base 1. Opposing slots (not shown) are formed in the guiding walls 21 to enable the locking base 1 to move without obstructing movement of the fixing wings 11. In addition, at the two sides of the parallel guiding walls 21 are positioned two supporting walls 22 which respectively cantilever support the fixing wings 11 so as to solidly stop the tape reels while the locking base 1 is in the locking position.

As the cassette is put into a tape player/recorder, the pin rises into a hole 24 formed in the cassette base 2 and pushes the locking base 1 out of the locked position. Meanwhile, the fixing wings 11 of the locking base 1, because of the backward movement of the locking base 1 and the interference of the supporting walls 22, move backward and additionally inward so that they are released from the serrations 31 of the reels, which can then rotate freely.

When the tape cassette is ejected, the locking base 1, because it is no longer being pushed by the pin of the recorder, immediately returns by its inherent resilience back to its normal "locked" position and meshes in one of the serrations 31 of the reels 3 via the fixing wings 11.

As can be seen, this structure strongly locks the reels in position. The problem with this approach, as discussed above, is that each reel floats independently relative to the hub receptacles. As such, when one reel floats and positions itself toward the back of the cassette and the other reel moves forward, integral reel locks such as the device of the '949 patent are incapable of reliably locking both reels under these conditions, so tape unravelling is not indeed accomplished. The integral actuator/reel lock/spring described in U.S. Pat. No. 4,449,677 suffers from the same problem. Because of this significant drawback, integral actuator/reel lock/springs have not been adopted by the industry, even though they represent substantial cost savings.

SUMMARY OF THE INVENTION

Accordingly, it is a purpose of the present invention to provide a tape cassette which can be made at less cost.

It is another purpose of the present invention to provide an integral actuator/reel lock/spring which can be assembled more easily by automation into a video cassette.

It is another purpose of the present invention to provide an integral actuator/reel lock/spring which lends itself to higher product yields.

It is another purpose of the present invention to provide an integral actuator/reel lock/spring having a single spring arm which rocks or pivots, instead of individual spring arms which are cantilevered.

Finally, it is a purpose of the present invention to provide an integral actuator/reel lock/spring which efficiently compensates for reel floating by pivoting from side-to-side with the moving reels.

To achieve the foregoing and other purposes of the present invention and in accordance with the purposes of the invention there is provided a video cassette, including: an integral actuator/reel lock/spring device; first means formed on the device and the cassette base for allowing the device to swing or float while in the locked position; and second means formed on the device and cassette base for centering the device when being moved into the unlocked condition.

More particularly, the device includes: (a) a lock body having a first end and a second end, an inclined opening formed at the first end to receive a tape player/recorder pin, lateral upper wings, and, as part of the first means, angled grooves formed at the bottom of the lock body; and (b) a spring bar formed at the second end of the lock body, the spring bar including a pawl and a lower dog leg combination formed at each end. The tape cassette includes: (a) a central area formed in the cassette base to receive the lock body, the area defined by: (i) a first, elongated, central portion having, as another part of the first means, a pair of parallel walls which are short and receive the grooves; and (ii) a pair of lateral, substantially triangular walled portions, each spaced from the central portion.

In one embodiment, the second means includes a lead-in formed in the lock body and a corresponding self centering rib formed centrally of the central portion. In another embodiment inwardly tapered walls are formed in the cassette base to extend from the parallel walls of the central portion and the second end of the lock body is correspondingly tapered. In either case, the means for centering only engages after the reel lock has left the locked position and is entering the unlocked condition.

The lock body fits substantially within the central portion of the base, with the grooves positioned at the parallel walls. The integral spring bar extends across the parallel walls such that the pawls are located against the lateral, triangular portions and the dog legs underlay the reels.

In the "locked" position, the lock body is positioned inward in the central portion, via the biasing spring bar normally urging the lock body in this direction. The pawls contact by ratchet action teeth formed on the circumference of each bottom reel flange. During this locked condition the reel lock of the invention has the ability to pivot or swing via the grooves to each side of the center line to move with the shifting reels.

When the cassette is placed in the player/recorder, a pin of the tape player/recorder enters the inclined opening, moves along the incline and forces the lock body against the force of the spring arm. Only at this time does the centering means engage. Also, the spring arm becomes more curved, pulling the pawls toward the center line and out of ratchet engagement with the teeth. The reel lock is now in the unlocked "position". As a result, the reels are then free to rotate during operation of the player/recorder.

After operation of the player/recorder, the pin is removed, and the lock returns to the normal "locked" position described above.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Figure 1:
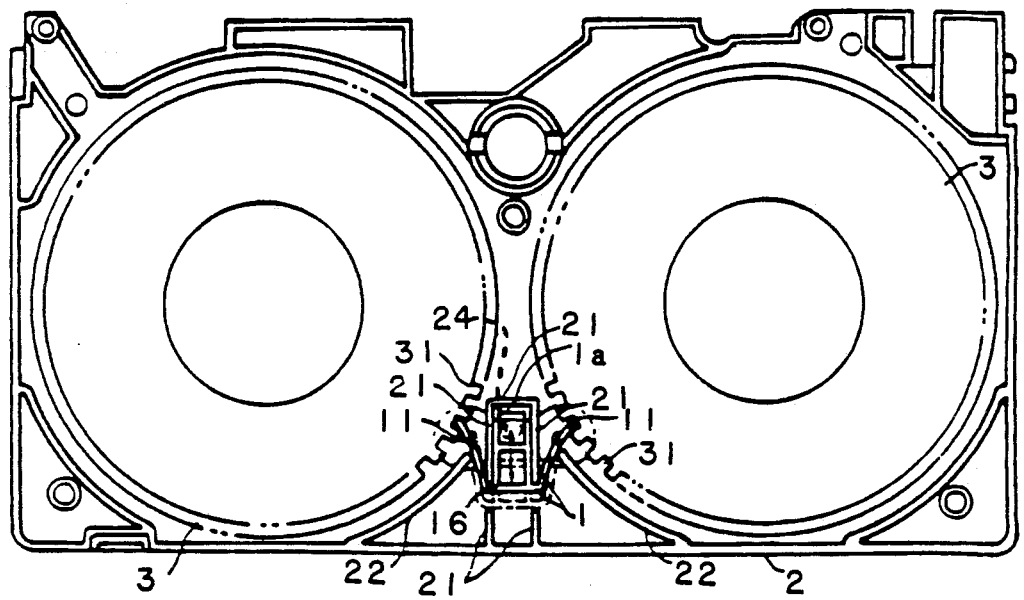
FIG. 1 is a perspective view illustrating a conventional reel lock received in a cassette base.

The preferred embodiments according to the present invention will now be described with reference to FIGS. 2-10.

In general, the invention is directed to a video cassette, including an integral actuator/reel lock/spring device 40 (hereinafter "reel lock"), first means 41 formed on the reel lock 40 and the cassette base 82 for allowing the reel lock 40 to swing or float relative to a center line 116 while in the locked position, and second means 43 formed on the reel lock 40 and cassette base 82 for centering the reel lock 40 only when being placed into the unlocked condition.

The details of the reel lock 40 structure will now be described with particular reference to FIGS. 2 and 3.

Figure 2:
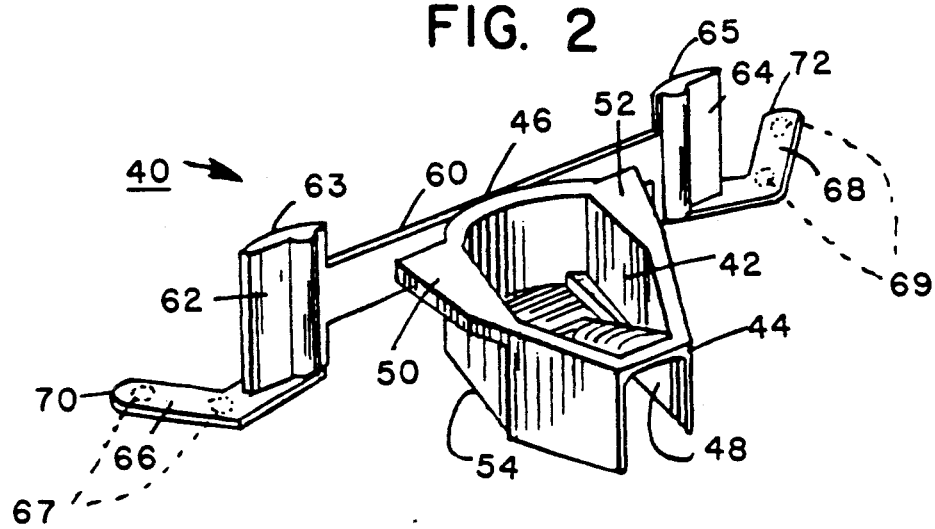
FIG. 2 is a perspective view illustrating the reel lock according to the present invention.
Figure 3:
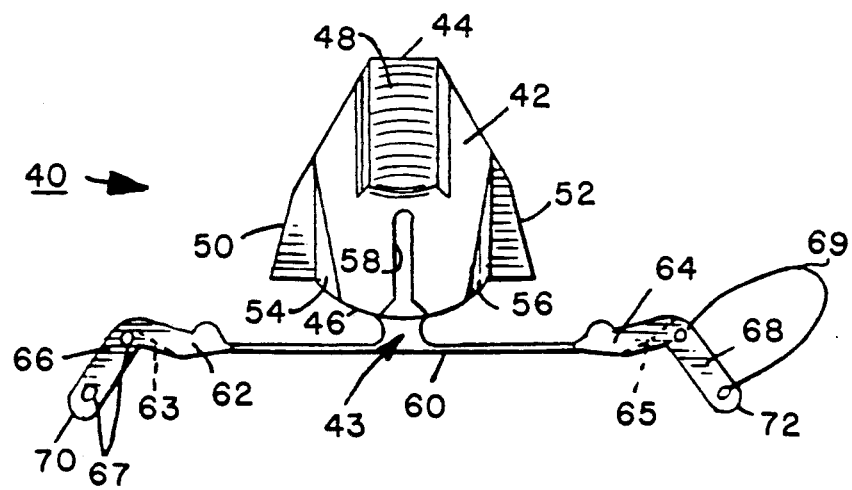
FIG. 3 is a bottom view illustrating the reel lock shown in FIG. 2.

FIG. 2 is a perspective view of the reel lock according to the present invention, and FIG. 3 is a bottom view of the reel lock 40 shown in FIG. 2. As shown therein, the reel lock 40 according to the present invention is a one-piece member.

The most cost-effective way to produce this one-piece reel lock is believed to be by injection molding from a resilient material such as acetal or nylon. Acetal appears to exhibit better properties for this invention than nylon. That is, the integral actuator/reel lock/spring fabricated from acetal pivots better.

The reel lock 40, includes: (a) a lock body 42 having a first end 44 and a second end 46, an inclined opening 48 formed at the first end 44 to receive a tape player/recorder pin 124 (FIGS. 7-10), lateral upper wings 50, 52, angled grooves 54, 56 formed below the wings 50, 52 and, in one embodiment, a lead-in 58 for a self-centering rib described below; and (b) a spring bar 60 connected centrally at the second end 46 of the lock body 42.

The inclined opening 48 is, e.g. at about a 45° angle. Further, the inclined opening 48 is concave so that as the pin 124 of the tape player/recorder rides along same, the pin 124 is self-centered.

The spring bar 60 includes a pawl 62, 64 and a lower dog leg 66, 68 combination at each end 70, 72 respectively. The rear surfaces 63, 65 of the pawls 62, 64 are curved intentionally to facilitate operation of the reel lock 40 as described below. Further, on the underside of each dog leg 66, 68 there is formed a pair of semi-spherical, anti-friction bumps or projections 67, 69. These bumps 67, 69 help cut down the friction between the dog legs 66, 68 and the cassette base 82 by minimizing surface contact therebetween when the lock body 42 pivots as described below. Most particularly, the bumps 67, 69 do not impound on the retraction gram forces which are applicable.

In the molded but not installed condition shown in FIGS. 2 and 3, the spring bar is substantially linear. In the installed condition described below in respect of FIGS. 5, 6 and 8, the spring bar 60 is curved substantially semicircularly.

Figure 4:
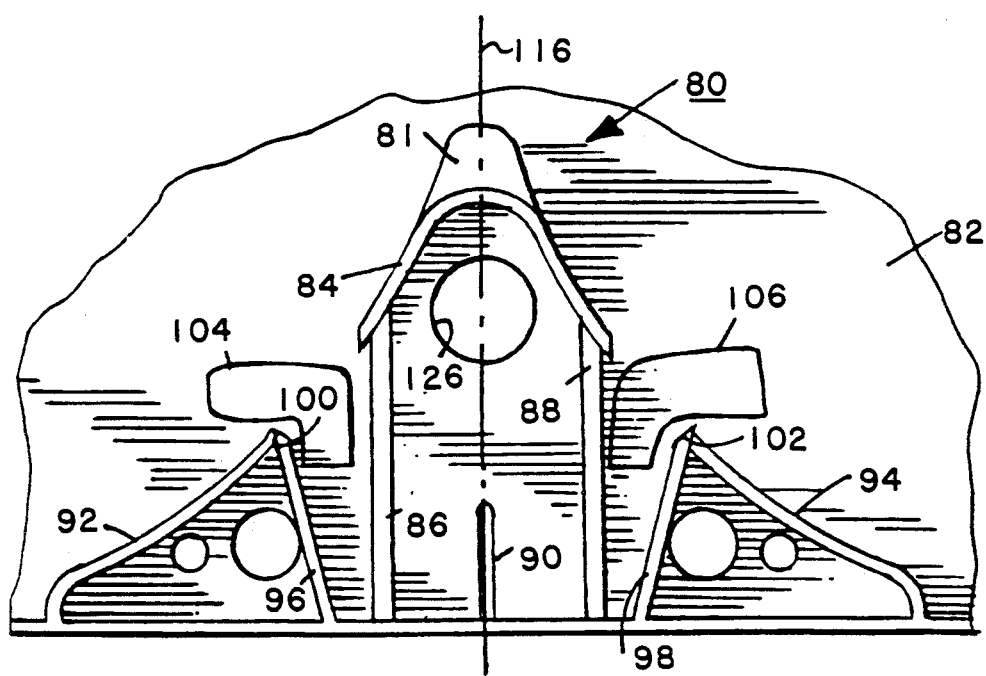
FIG. 4 is a plan view illustrating the area of the cassette base which receives the reel lock according to the present invention.

FIG. 4 is a top view of an area 80 formed in the tape cassette base 82 for receiving the reel lock 40 according to the present invention. As shown therein, the area is defined by: (a) a first, elongated, central portion 84 having a curved end 81, parallel side walls 86, 88 extending therefrom to a side wall 85 of the cassette base 82, between which is formed, in one embodiment, a self-centering rib 90; and (b) a pair of lateral, substantially triangular walled portions 92, 94, each spaced from the central portion 84. A depression or channel 104, 106 is formed in the spaces between the lateral portions 92, 94 and the central portion 84, and an opening 126 is formed near the curved end 81 to receive the pin 124.

Inner walls 96, 98 of the triangular walled portions 92, 94 are non-parallel. Points 100, 102 of the triangular walled portions 92, 94 are flat. Since the rear portions 63, 65 of the pawls 62, 64 are curved, the point of contact of the moving pawls 62, 64 against the points 100, 102 is a curve on a plane, respectively. This configuration cuts down friction and facilitates rocking of the reel lock 40, as opposed to planar-planar or curve-curve interfaces.

The cassette cover 83 merely includes corresponding parallel walls (not shown) positioned above the wings 50, 52 of the reel lock 40. These walls on the cover 83 allow the reel lock 40 to move freely from the locked position to the unlocked position and to float while in the locked position, as described below.

Figure 5:
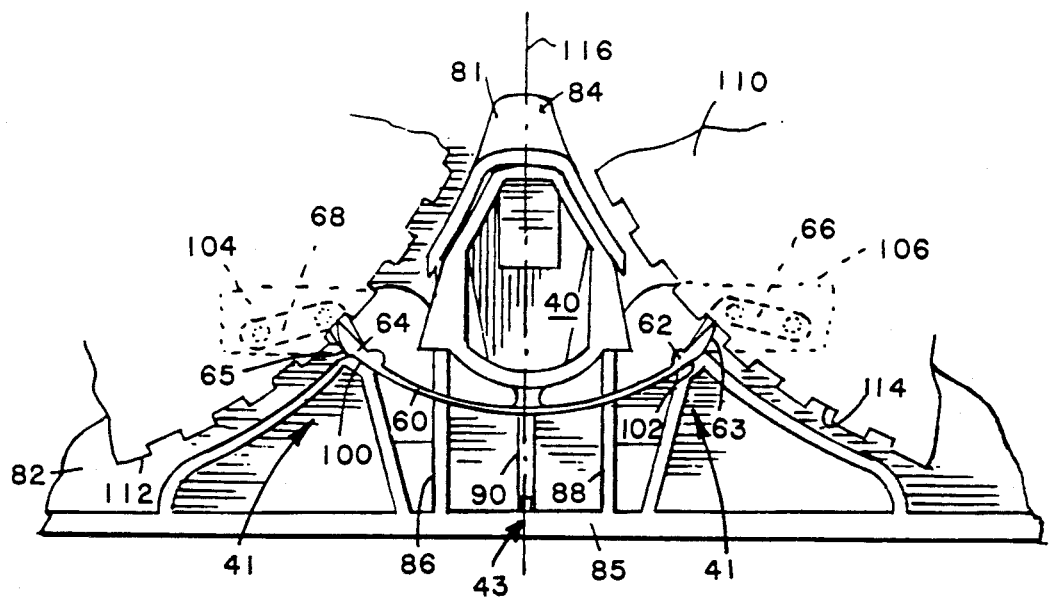
FIG. 5 is a plan view illustrating the reel lock in the locked position according to the present invention.

FIG. 5 is a top view of the reel lock 40 received in the cassette base 82 in the "locked" position according to the present invention. More specifically, the lock body 42 fits substantially within the central portion 84 of the base 82, with the grooves 54, 56 extending over the parallel walls 86, 88. The integral spring bar 60 extends across the parallel walls 86, 88 such that the pawls 62, 64 are located in the channels 104, 106, with the rear portions 63, 65 thereof against the points 100,102 of the lateral, triangular portions 92, 94 and the dog legs 66, 68 underlaying reels 108, 110, respectively.

In the "locked" position, the lock body 42 is biased against the curved end 81 of the central portion 84, via the spring bar 60 normally urging the lock body 42 in this direction. The pawls 62, 64 contact by ratchet action teeth 112, 114 formed on the circumference of each reel 108, 110 bottom flange. The dog legs 66, 68 stay under the reels 108, 110 at all times, which prevents the pawls 62, 64 from overriding the reels 108, 110 or tilting excessively during ratcheting.

An added benefit of the dog legs 66, 68 is that they facilitate assembly. That is, when the reel lock 40 is positioned in the cassette base 82 and the reels 108, 110 are placed thereon, the dog legs 66, 68 prevent the reel lock 40 from being dislodged during subsequent assembly steps required before the cassette cover 83 is placed on the cassette base 82 to complete assembly of the video cassette.

Figure 6:
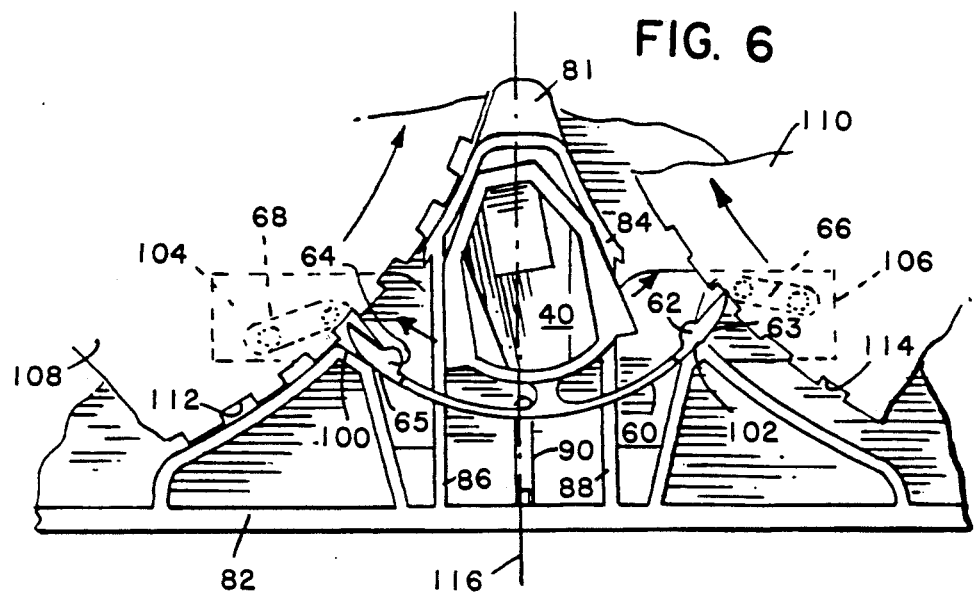
FIG. 6 is a plan view illustrating the floating movement of the reel lock while still in the locked position.

FIG. 6 shows the pivoting or floating movement of the reel lock 40 while still in the locked condition. More particularly, during storage, handling, etc., the reels 108, 110 have a tendency to shift in all directions. In conventional cassettes where the reel lock is strongly engaged with the teeth on the reels, i.e., the lock is inflexible, the shifting of the reels causes disengagement of one or both arms and gradual undesired slackening of the tape. The reel lock 40 of the invention has the ability to pivot or float to each side of the center line 116 via the grooves 54, 56 moving over the parallel walls 86, 88 to move with the shifting reels 108, 110, while still maintaining the locked condition. The spring bar 60 still provides a centering force during reel lock flotation. Preferably, movement is about 10°-12° to either side. but same is not intended to be limitative.

Figure 7:
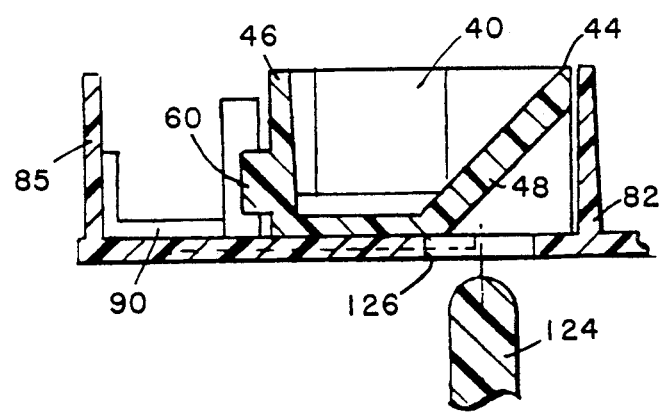
FIG. 7 is a side, cross-sectional view illustrating the reel lock in the locked position with the tape player/recorder pin about to enter same.
Figure 8:
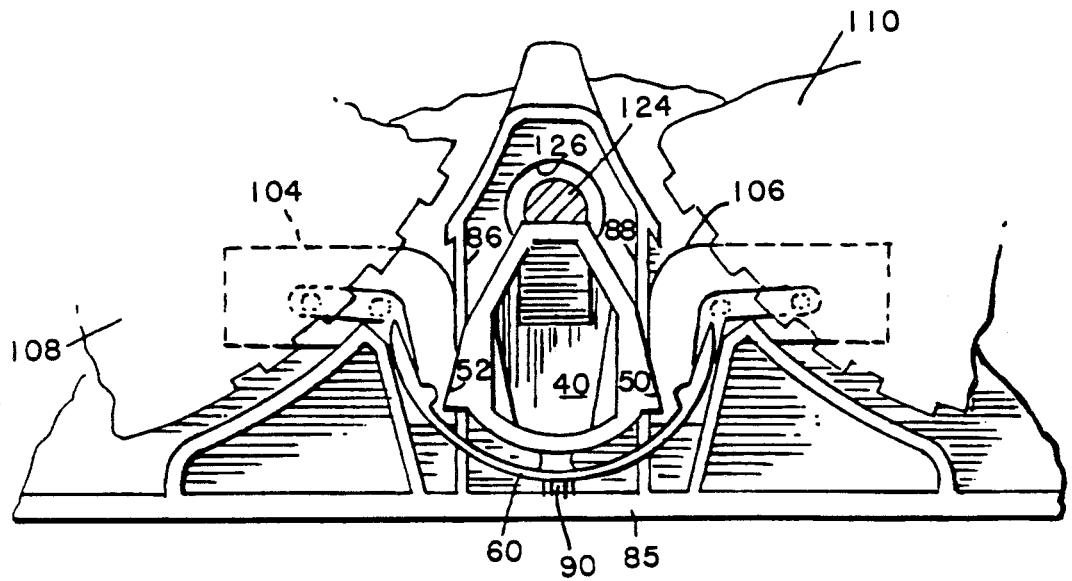
FIG. 8 is a plan view illustrating the reel lock in the unlocked position.
Figure 9:
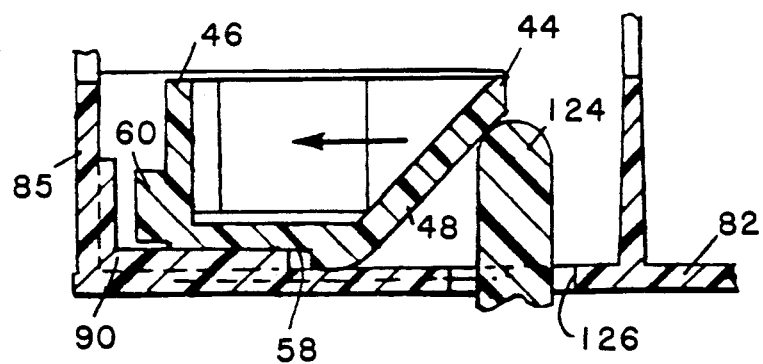
FIG. 9 is a side, cross-sectional view illustrating the reel lock being pushed into the unlocked position by the pin.

FIG. 7 shows the reel lock 40 in the locked position with the tape player/recorder pin 124 about enter same. FIG. 8 shows the reel lock 40 received by the cassette base 82 in the unlocked condition, and FIG. 9 shows the reel lock 40 after being pushed into the unlocked position by the pin 124. More particularly, when the cassette is placed in the player/recorder, the pin 124 of the tape player/recorder enters the opening 126, moves along the inclined opening 48 and forces the lock body 42 against the force of the spring arm 60 toward the side wall 85 of the base 82. Also, the spring arm 60 becomes more curved, pulling the pawls 62, 64 toward the center line 116 and out of ratchet engagement with the teeth 112, 114. As a result, the reels 108, 110 are then free to rotate during operation of the player/recorder. This is referred to as the unlocked position.

Only after the reel lock leaves the locked position does the lead-in 58 begin receiving the self-centering rib 90 to direct the lock body 42 backwardly along the center line 116 of the central portion 84. This feature assures both reels 108, 110 will be equally disengaged. The rib 90, and the lead-in 58 combine to form one embodiment of the centering means 43 according to the present invention.

Centering means are known but they operate much differently. More particularly, U.S. Pat. No. 4,742,415 discloses a rib formed in the cassette base and a corresponding recess formed on the bottom of the reel lock or vice versa. However, this patent teaches that the rib/recess combination must extend the full travelling length between the locked and unlocked position so that movement lateral of the center line is intentionally suppressed. According to this prior art structure, which teaches away from the present invention, it would be impossible for the reel lock to float or swing and compensation of the floating reels could not be accomplished.

Figure 10:
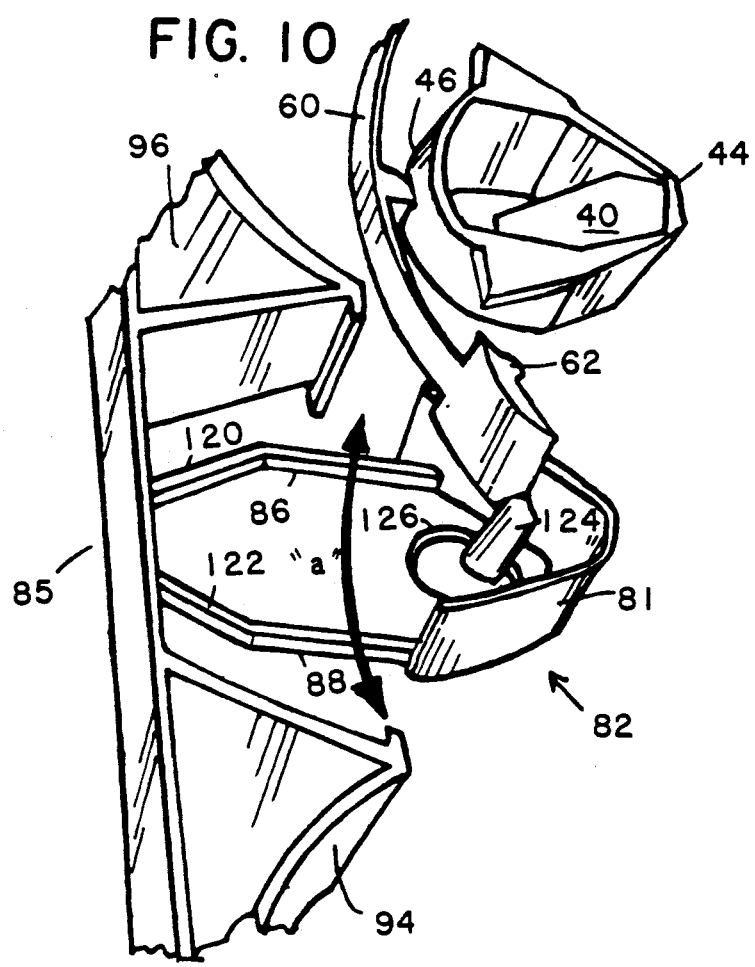
FIG. 10 is a perspective, exploded view of an alternate embodiment of a centering means according to the present invention.

FIG. 10 illustrates an alternate embodiment of the centering means 43 according to the present invention. In this embodiment, the lead-in 58 and self centering rib 90 are eliminated. Instead of the parallel walls 86, 88 extending all the way back to side wall 85 of the cassette base 82, the parallel walls 86, 88 are abbreviated and connect to inwardly tapered walls 120, 122 which extend to the side wall 85 of the cassette base 82. Moreover, the second end 46 of the reel lock 40 is correspondingly tapered inward. As such, after the pin 124 moves the reel lock 40 out of the locked position, the tapered walls 120, 122 receive and center the tapered second end 46 of the reel lock 40 relative to the center line 116 of the central portion 84. With this embodiment, the reel lock 40 is still able to float or swing relative to the center line 116 while in the locked position as shown by arrow "a".

After operation of the player/recorder, the pin 124 is removed, and the reel lock 40 returns to the normal "locked" position described above.

The above-described reel lock has been shown to be the type intended for use in video player/recorders. However, the invention can be similarly applied to tape cassettes for use in audio or other recording and/or reproducing apparatus.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to that fall within the scope of the invention and the appended claims.

We claim:

1. A one-piece reel lock device for a tape cassette including a cassette base with a first, elongated, central portion having a pair of lateral portions, a cassette cover, and a pair of tap reels, the reel lock comprising:
   (a) a lock body having a first end and a second end, an inclined area formed at the first end to receive a tape player pin, and a spring bar formed at the second end of the lock body, the spring bar including two opposite free ends and tape reel engaging means at each free end,
   wherein said lock body is movable between a position locking the tape reels against rotation and a position unlocking the tape reels to allow rotation of the tape reels; and
   (b) means formed on the lock body and the cassette for centering the lock body in the central portion, only after the lock body leaves the locked position and while the lock body is in an unlocked position,
   wherein the lock body is in the locked position, when the lock body is positioned inward in the central portion, via the spring bar free ends abutting the lateral portions and normally urging the lock body in this direction, the engaging means engage each tape reel, and the lock body can freely pivot to either side of a center line of the central portion in response to one of the reels moving due to tolerance fits, and
   wherein the lock body is in an unlocked position when the lock body is moved backward in the central portion of the base by the tape player pin, with the tape reel engaging means disengaged from the tape reels the centering means engaged and the lock body movable only in a linear path.

2. The device as recited in claim 1, wherein the centering means comprises:
   (c) a lead-in recess formed in the lock body for receiving a self-centering rib formed in the tape cassette.

3. The device as recited in claim 1, wherein the second end is inwardly tapered for being received in correspondingly tapered walls formed in the tape cassette.

4. The device as recited in claim 1, wherein the inclined area is concave to center the pin.

5. The device as recited in claim 1, wherein the tape reel engaging means includes a pawl and a lower dog leg combination at each end, each dog leg including at least one semi-spherical projection on a bottom portion thereof.

6. The device as recited in claim 1, injection molded from acetal.

7. The device as recited in claim 1 injection molded of nylon.

8. A tape cassette, comprising:
   (a) a cassette base including
      (i) a first, elongated, central portion and
      (ii) a pair of lateral portions;
   (b) a cassette cover;
   (c) a pair of tape reels; and
   (d) a one-piece reel lock, including a lock body having a first end and a second end, an inclined area formed at the first end to receive a tape player pin, and a spring bar formed at the second end of the lock body, the spring bar including two opposing free ends and tape reel engaging means at each free end,
   wherein said lock body is movable between a position locking the tape reels against rotation and a position unlocking the tape reels to allow rotation of the tape reels, and
   (e) means formed on the lock body and the cassette for centering the lock body in the central portion only, after the lock body leaves the locked position and while the lock body is in the unlocked position,
   wherein the lock body is in the locked position, when the lock body is positioned inward in the central portion, via the spring bar free ends abutting the lateral portions and normally urging the lock body in this direction, the engaging means engage each tape reel, and the lock body can pivot to either side of a center line of the central portion in response to one of the reels moving due to tolerance fits, and
   wherein the lock body is in the unlocked position when the lock body is moved backward in the central portion of the base, with the tape reel engaging means disengaged from the tape reels and the centering means engaged.

9. The tape cassette as recited in claim 8, wherein the means for centering comprises:
   the lock body second end being tapered and the central portion including a pair of short, parallel walls combined with a pair of inwardly angling walls,
   wherein, when the cassette is placed in the tape player, the pin of the tape player enters the inclined area, moves along the incline, forces the lock body against the force of the spring arm, the pair of inwardly angled walls receives the tapered second end of the reel lock to orient the lock body along a center line of the central portion, the spring arm becomes more curved, pulling the tape reel engaging means toward the center line and out of engagement with the tape reels, and the tape reels are free to rotate during operation of the player.

10. The tape cassette according to claim 8, wherein the tape reel engaging means includes a pawl and a lower dog leg combination at each end, each pawl including a curved surface which interfaces with a planar point formed on each lateral portion while the lock body is in the locked position.

11. The tape cassette as recited in claim 10, wherein each dog leg includes at least one semi-spherical projection on a bottom portion thereof.

12. The tape cassette as recited in claim 8, wherein the inclined area is concave to center the pin.

13. The tape cassette as recited in claim 8, wherein the reel lock is injection molded from acetal.

14. The tape cassette as recited in claim 8, wherein the reel lock is injection molded of nylon.

15. A tape cassette, comprising:
    (a) a cassette base including
       (i) a first, elongated central portion having paralle walls, and (ii) a pair of lateral portions, each spaced from the central portion;
(b) a cassette cover;
(c) a pair of tape reels;
(d) an integral reel lock, including
  (i) a lock body having a first end and a second end, an inclined area at the first end to receive a tape player pin, lateral upper wings and angled lower grooves, and
  (ii) a spring bar formed at the second end of the lock body, the spring bar including a pawl and a lower dog leg combination at each end,
wherein the lock body fits substantially within the central portion of the base, with the wings extending over the parallel walls, the grooves resting on the parallel walls, the spring bar extending across the parallel walls, the pawls pivotably mounted against the lateral portions and the dog legs underlaying the reels;
(e) means for orienting the lock body centrally of the central portion only after the lock body leaves the locked position and while the lock body is in the unlocked position,
wherein the means for centering comprises:
  (1) a lead-in recess formed in the lock body; and
  (2) a self-centering rib formed in the cassette base, wherein, when the tape cassette is placed in the tape player, a pin of the tape player enters the inclined area, moves along the inclined, area forces the lock body against the force of the spring arm, the lead-in receives the self-centering rib to orient the lock body along a center line of the central portion, the spring arm becomes more curved, pulling the tape reel engaging means toward the center line and out of ratchet engagement with the teeth, and the tape reels are free to rotate during operation of the tape player.

16. A method for assembling a reel lock in a tape cassette, comprising the steps of:
(a) forming a cassette base including
  (i) a first, elongated, central portion, and
  (ii) a pair of lateral portions;
(b) forming a pair of tape reels;
(c) fitting the tape reels in the cassette base;
(d) forming a one-piece reel lock, including—a lock body having a first end and a second end, an inclined area formed at the first end to receive a tape player pin, and a spring bar formed at the second end of the lock body, the spring bar including tape reel engaging means at each free end,
wherein said lock body is movable between a position locking the tape reels against rotation and a position unlocking the tape reels to allow rotation of the tape reels,
(e) forming means on the cassette and lock body for centering the lock body in the central portion, only after the lock body leaves the locked position and while the lock body is in the unlocked position;
(f) fitting the lock body substantially within the central portion of the base in the locked position with the lock body positioned inward in the central portion, via the spring bar free ends abutting the lateral portions and normally urging the lock body in this direction, the engaging means engaging each tape reel, and the lock body able to pivot to either side of a center line of the central portion in response to one of the reels moving due to tolerance fits; and
(g) moving the lock body into the unlocked position by moving the lock body backward in the central portion of the base by the tape player pin, thereby disengaging the tape reel engaging means from the tape reels and engaging the centering means.

* * * * *

UNITED STATES PATENT AND TRADEMARK OFFICE
CERTIFICATE OF CORRECTION

PATENT NO. : 5,056,735
DATED : October 15, 1991
INVENTOR(S) : Gelardi et al.

It is certified that error appears in the above-identified patent and that said Letters Patent is hereby corrected as shown below:

```
Abstract, line 30, "forece" should be --force--;
         line 31, "selt" should be --self--.

Col. 1,  line 8, after "cassette" insert a period.

Col. 4,  line 57, after "72" insert a comma.

Col. 6,  line 12, after "about" insert --to--.
```

Signed and Sealed this

Eleventh Day of May, 1993

Attest:

MICHAEL K. KIRK

*Attesting Officer*   Acting Commissioner of Patents and Trademarks